United States Patent [19]

Strong et al.

[11] 4,324,211

[45] Apr. 13, 1982

[54] TORCH IGNITION APPARATUS AND METHOD

[75] Inventors: Grant H. Strong, Richland, Wash.; Kline D. Strong, Salt Lake City, Utah

[73] Assignee: Strong Research, Salt Lake City, Utah

[21] Appl. No.: 88,872

[22] Filed: Oct. 26, 1979

[51] Int. Cl.³ .............................................. F02B 19/06
[52] U.S. Cl. ........................ 123/143 A; 123/65 VA; 123/257; 123/262; 123/288; 123/292; 123/41.78
[58] Field of Search ............... 123/143 A, 143 B, 257, 123/253, 288, 278, 286, 292, 262, 263, 65 VA, 312, 81 C, 188 C, 188 B, 306, 41.78

[56] References Cited

U.S. PATENT DOCUMENTS

| | | | |
|---|---|---|---|
| 973,651 | 10/1910 | Haberkorn | 123/143 A |
| 1,231,799 | 7/1917 | Simpson | 123/306 |
| 1,825,817 | 10/1931 | Patterson | 123/306 |
| 2,091,987 | 9/1937 | Honn | 123/143 A |
| 2,158,124 | 5/1939 | Honn | 123/143 A |
| 2,171,783 | 9/1939 | Dennison | 123/41.78 |
| 2,465,116 | 3/1949 | Petersen | 123/143 A |
| 3,000,366 | 9/1961 | Blackburn | 123/65 VA |
| 3,058,453 | 10/1962 | May | 123/143 A |
| 3,580,231 | 5/1971 | Bradbury | 123/143 A |
| 3,736,911 | 6/1973 | Melchlor | 123/65 VA |
| 4,075,996 | 2/1978 | Hisserich | 123/143 A |
| 4,162,664 | 7/1979 | Fleming | 123/288 |
| 4,237,827 | 12/1980 | Hamai | 123/262 |

*Primary Examiner*—Charles J. Myhre
*Assistant Examiner*—Andrew M. Dolinar
*Attorney, Agent, or Firm*—J. Winslow Young; H. Ross Workman; Rick D. Nydegger

[57] ABSTRACT

A torch ignition apparatus and method, the apparatus including a secondary, torch ignition piston interconnected to the primary piston and operable to produce through compression ignition of a carbureted fuel/air mixture a jet of hot gases capable of igniting a fuel and air mixture compressed in a primary combustion chamber by the primary piston. The apparatus also includes a secondary fuel system for supplementing a low ratio fuel/air mixture in the combustion chamber and a novel hoop valve and exhaust port system for providing a unique, highly efficient flow-through system for exchanging gases in the combustion chamber.

11 Claims, 1 Drawing Figure

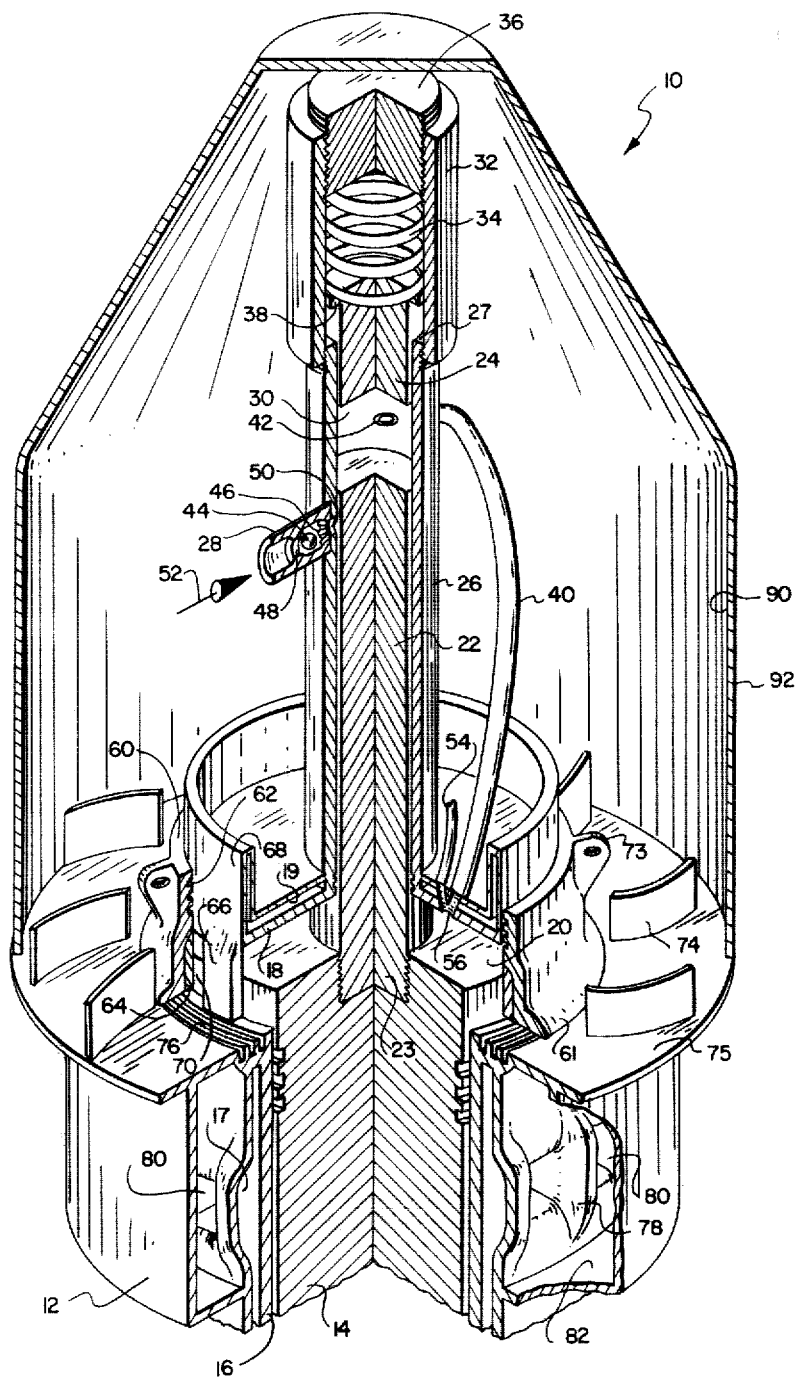

TORCH IGNITION APPARATUS AND METHOD

BACKGROUND

1. Field of the Invention

The present invention relates to ignition systems for internal combustion engines and, more particularly, to a novel intake, exhaust and torch ignition apparatus for a combustion chamber of a cylinder of an internal combustion engine.

2. The Prior Art

Historically, internal combustion engines incorporate either a compression ignition system (diesel-type), a spark ignition system or variations of these systems to ignite the fuel/air mixture in the combustion chamber. The spark-ignition engine utilizes carburetion (a premixing of the fuel, usually gasoline, with air) prior to directing the fuel/air mixture into the combustion chamber. The conventional carburetor is a relatively inefficient device in that much of the gasoline is not completely vaporized but remains in droplet form as it enters the combustion chamber with the result that some of these droplets are discharged into the exhaust as unburned hydrocarbons. Additionally, the combustion temperature from the spark-initiated ignition is relatively low with the result that there is incomplete combustion so that additional quantities of gasoline are discharged into the atmosphere as unburned or incompletely burned hydrocarbons and carbon monoxide. While strenuous efforts have been directed toward the reduction of these pollutants by various devices including the injection of supplemental air into the exhaust system to continue the combustion process, catalytic convertors, and the like, only modest results have been obtained in spite of the high cost of the apparatus.

Attempts to increase the efficiency of the internal combustion engine and also the horsepower available have succeeded dramatically by using higher compression ratios on the order of about 10:1 or even 11:1. However, gasoline frequently detonates spontaneously at these higher compression ratios with an adverse effect on engine performance and life. The addition to gasoline of detonation inhibitors such as tetraethyl lead, tricresolphosphate, and the like, inhibits detonation thereby accommodating high compression ratios. However, since lead is a significant pollutant, numerous governmental regulations have been adopted against its usage. Accordingly, the current gasoline or spark-initiated engines are directed toward using unleaded gasoline with the result that they cannot be operated at compression ratios much greater than about 9:1 without fear of detonation.

In summary, the current spark-initiated, internal combustion engines have a relatively low efficiency for the following reasons:

(1) Lower compression ratios, (2) Poor combustion as a result of lower compression ratios and consequent low maximum operating temperature, (3) Poor combustion as a result of poor carburetion, and (4) Governmentally-mandated anti-pollution devices which have uniformly reduced engine efficiency.

The compression ignition or diesel-type engine is inherently more efficient than the spark-initiated ignition engine since (1) there is more energy per weight in diesel fuel than gasoline and (2) the engine operates at a higher combustion temperature and compression ratio. Customarily, the compression ratio for a relatively small engine, such as in an automobile, is as high as 23:1 in order for the temperature to be high enough to ignite the injected fuel. The higher combustion temperatures also mean a more thorough combustion of the hydrocarbons and carbon monoxide with a corresponding increased energy release and consequent greater mechanical energy produced for the same volume of fuel consumed. Admittedly, compression-ignition engines characteristically exhibit a lower horsepower per pound of fuel consumed than spark-ignition engines. This lower horsepower generally results from the high peak pressures (which, in turn, require a heavier engine structure) and from other problems which exceed the savings realized from the more thorough combustion.

Ignition in a compression-ignition engine results when an air induction charge is compressed in the combustion chamber to a relatively high pressure and a correspondingly high temperature above the ignition temperature of the fuel so that subsequently injected fuel ignites as it is injected. The fuel must be injected rapidly, or almost all at once, so that there will be at least some of the injected fuel that is an appropriate mixture of fuel and air for immediate autoignition. However, other parts of the injected mixture will be typically too rich for ignition while some parts will be too lean, although injection almost all at once insures that at least some of the fuel and air will be at the appropriate mixture for instantaneous ignition.

On the other hand, if the fuel is injected slowly, ignition will not start instantaneously because there will not always be a correct mixture for ignition at the instant of injection. After enough fuel has finally been injected so that some of it is at the correct mixture, it will ignite. However, by the time ignition occurs, a considerable quantity of fuel that had previously been injected will be relatively close to the correct ignition mixture so that it will ignite from the mixture that actually was first ignited, although later injected. Upon this occurance, the large quantity of previously injected fuel ignites extremely rapidly with a consequent very rapid and abnormally high rise in the cylinder pressure and temperature. This phenomena is essentially equivalent to a secondary detonation of "carbureted fuel." This is not desirable and can result in piston and cylinder damage. As a result, a small to medium-size, diesel-fueled, compression-ignition engine requires that all of the fuel that is supplied to a cylinder in a particular stroke or revolution must be injected at once in order to prevent the subsequent detonation caused by the combination of (a) carburetion and (b) delayed ignition that occurs when the fuel is injected slowly.

Although it is necessary for a rapid and full injection of fuel to prevent abnormal and unwanted detonation of "carbureted fuel", this very process causes most of the problems in small automobile-sized diesel engines. When all of the fuel is injected, the subsequent pressure and temperature rise is virtually uncontrolled and both rise to very high values early in the power part of the stroke. This pressure rise is so rapid that the peak pressure occurs before the sine of the power angle is large enough to produce very much torque. For example, at top dead center (TDC) with the power angle at 0 degrees, any amount of pressure would produce zero torque since the sine of 0 degree is zero. Furthermore, if the peak pressure occurs at a power angle of about 10 or 15 degrees, the sine of the angle is still modestly low so that not much torque results. However, the structure of the engine must be sufficiently strong so as to be able to withstand these relatively high pressures. Engine strength is usually defined by engine weight so that the resulting heavy piston and connecting rod parts restrict the maximum speed of the engine and make it relatively sluggish so that it cannot increase in speed rapidly or operate very fast.

A second problem arises from the requirement that the diesel fuel be injected all at once. When autoignition occurs and thus initiates the overall combustion process in the cylinder, secondary turbulence produced by the initial combustion causes the remainder of the fuel to mix with air in the cylinder so that the combustion process can continue. However, this process is not very efficient and much of the fuel is never suitably mixed with air. The unmixed fuel is turned to carbon particles by the high temperatures and is discharged into the exhaust as soot. Exhaust soot is the primary pollutant in a small diesel engine, and it also infiltrates into the oil system necessitating relatively frequent oil changes. Although carburetion would be an excellent solution to the soot problem of the diesel engine so that essentially all of the fuel could be burned, the very fact that carbureted diesel fuel burns so rapidly—approaching or encompassing detonation speeds and pressures with attendant problems described above—makes full carburetion an almost impossible, idealistic goal.

A third problem arises from the high temperature that results from having to inject all of the fuel at once. The high temperatures that occur in a diesel engine are so high that a large percentage of the nitrogen combines with oxygen and is discharged into the air as oxides of nitrogen.

As noted before, combustion pressure is almost completely uncontrollable in spark and compression ignition engines. About all that can be controlled in these engines is the maximum pressure. Subsequent power angle pressures largely follow the formula $PV/T=C$, and are definitely not optimum for maximizing efficiency and horsepower while minimizing pollutants.

While the fuel-air charge in most spark ignition engines at the time of combustion is essentially a homogenous and vaporized mixture of fuel and air; if the distribution of fuel is not uniform within the chamber, zones of varying air/fuel ratios will be present. Such a mixture is termed a stratified charge. For example, in a stratified charge, the air/fuel ratio at one point in the chamber might be 16:1 while only air might exist at another point in the chamber. The purposes of the stratified charge, spark ignition engine are to: (1) permit use of a leaner mixture than could ordinarily be used in producing ignition successfully; and (2) avoid knock with the result that either high compression ratios or low-grade fuels (or both) can be used. A stratified charge can theoretically eliminate knock because the end gas need not be a combustible mixture. The residence (heating time) of the fuel is also short because injection begins late in the compression stroke.

The stratified-charge principle is one technique used for obtaining high compression (expansion) ratios in combination with spark ignition. However, it is difficult to initate combustion in lean mixtures by a spark discharge and, since mixtures are never perfectly homogeneous, several regions might necessarily have to be ignited to assure continued flame propogation. Additionally, the propogation of the flame becomes increasingly slower as the ratio of fuel to air is reduced, until it virtually ceases at values of approximately 0.025 (fuel-air ratio). Accordingly, the release of energy arising from, say, two ignition points would be extremely slow. One solution to this problem is offered by the use of a dual-fuel diesel engine. In this engine, a homogenous and lean mixture of gas and air is compressed to a high pressure and temperature and thereafter ignited by injecting a small pilot charge of fuel oil. The small spray of oil establishes a large number of ignition points, not on the edges of the chamber as with sparkplugs, but throughout the entire gas-air mixture. The mixture ratio in the vicinity of the oil droplets will be enriched and combustion will start smoothly and rapidly. A number of flame fronts will thereby be established, although as each flame penetrates into the gas-air mixture, its progress will become slower. In fact, if the air-gas ratio exceeds about 40 to 1, the flame may be extinguished in part, as evidenced by unburned fuel in the exhaust. Therefore, it is interesting to note that in the dual-fuel engine, combustion starts in similar fashion to a compression ignition engine and combustion continues by flame propogation, in a similar fashion to a spark ignition engine. The advantage of a dual-fuel engine is that it will exceed the performance of a straight diesel engine at full load, since vaporized gasoline or gas is present in all parts of the chamber and therefore, more air can be burned.

The principle of one experimental engine can be visualized by assuming a circular motion of the air in the cylinder on the compression stroke. At about 50° before top dead center, let a nozzle start to inject fuel tangentially into the air stream and continue the injection for, say 50° of crank movement (at full load). Meanwhile, in a position downstream from the nozzle, a sparkplug is located, and, after injection begins, a spark occurs (say 30° before TDC) when initial fuel-air mixture is swept by turbulence (air swirl) past the sparkplug. Here the flame will be initiated and propogated, mainly in a direction opposite to the swirl with establishment of a burning zone. The liquid fuel leaving the nozzle will vaporize, mix with air, and then burn, thus establishing the lower boundary of the zone. The products of combustion will be carried out of the burning zone and swept around the combustion chamber. In this manner, the fuel/air mixture will be burned directly after the fuel enters the chamber, and without waiting for a flame to travel to the mixture position in the combustion chamber.

Conventionally, the develoment of an injection-type, stratified-charge engine introduced a new problem of coordinating the injection of fuel with the design and turbulence of the combustion chamber. This coordination has not only been difficult to achieve, but it has been indicated to be rather improbable that one design could successfully operate over wide limits of loads and speeds utilizing the present systems for ignition. In particular, the nozzle must not only give good atomization but also selective distribution: a local combustion area must originate and develop from the spark plug location. Moreover, the nozzle and turbulence must, in some manner, follow the principles dictated by volume distribution, if the pressure rises are to occur at the most advantageous crank angles. It has, therefore, been indicated to be quite improbable that the process will give, in itself, such optimum pressure-like characteristics. The primary advantage to the injection-type, spark ignition engine is that it can handle a number of fuels (fuel oil or gasoline) while other engines are more particular since knock, a destructive process, can intervene.

A third type of engine is the torch-ignition engine. It utilizes neither a spark nor high compression to initiate combustion. Ignition is produced at the proper part of the stroke by extremely hot gases in the form of a torch or searing flame. Inasmuch as the torch technology is not subject to the inhibiting deficiencies of either the spark or compression-type engines—as will be shown—all of the weaknesses of these other two kinds of engines can either be ameliorated or wholly eliminated, thus increasing efficiency and horsepower while decreasing the presence of pollutants. For example, the optimum compression ratio for a small automobile engine is about 16:1. At this compression ratio, efficiency and horsepower can be maximized and the creation of pollutants can be minimized. While a torch can ignite a fuel at a compression ratio of 16:1, a carbureted gasoline spark-initiated engine will detonate at that ratio and a small compression ignition or diesel-fueled engine would not ignite at all at that ratio unless very hot. Inasmuch as efficiency increases rapidly up to a compression ratio of about 16:1, controlled fuel injection with a torch ignition system can always be operated at the most efficient compression ratio because ignition is always assured and timing of ignition is completely controllable.

Torque, and hence horsepower, can also be maximized at optimum power angles while concurrently limiting extreme maximum pressures and temperatures. This is accomplished by injecting fuel at the optimum angle near TDC, and regulating or controlling the injection rate so as to predetermine the resulting pressure rise from combustion at the desired optimum value for each arc of the power angle—the angle of the crankshaft between TDC and commencement of exhaust.

In summary, each prior art system is directed toward providing an internal combustion engine that is more economical in its consumption of fuel and/or more efficient in the fuel combustion. However, none of the known devices relate to an internal combustion engine apparatus and method whereby a lean fuel/air mixture is contained within the combustion chamber while a flame front is created within the combustion chamber by injecting high temperature gasses and additional fuel into the combustion chamber.

In view of the foregoing, it would be a significant advancement in the art to provide a novel internal combustion engine apparatus and method whereby a flame front is created within the compressed air or lean fuel/air mixture in the combustion chamber of an internal combustion engine, the flame front being created by injecting high temperature gasses and additional fuel into the combustion chamber. It would also be an advancement in the art to provide a novel internal combustion engine apparatus and method whereby the fuel/air mixture is introduced into the combustion chamber in a swirling motion to thereby continuously feed the fuel/air mixture through the flame front during the combustion cycle. It would also be an advancement in the art to provide a novel intake and exhaust apparatus and method thereby readily adapting the apparatus and method of this invention to an internal combustion engine. Such a novel internal combustion engine apparatus and method is disclosed and claimed herein.

BRIEF SUMMARY AND OBJECTS OF THE INVENTION

The present invention relates to a novel apparatus and method for initiating combustion in a combustion chamber of an internal combustion engine. Combustion is initiated by establishing a flame front within the combustion chamber, the flame front being formed by injecting a high temperature gas and additional fuel into the combustion chamber. The additional fuel supplements the lean fuel/air mixture or air-only charge in the combustion chamber while the high temperature gasses raise the temperature of the resulting fuel/air mixture above the ignition temperature of the mixture. Novel intake and exhaust systems are also included for the purpose of more efficiently exchanging the gasses within the combustion chamber.

It is, therefore, a primary object of this invention to provide improvements in internal combustion engines.

Another object of this invention is to provide an improved apparatus for initiating combustion of a fuel/air mixture in a combustion chamber of an internal combustion engine by injecting high temperature gases—or torch—from a source independent of the fuel mixture in the main cylinder and establishing a flame front in the combustion chamber.

Another object of this invention is to provide an improved method for initiating combustion of a fuel/air mixture in the combustion chamber of an internal combustion engine.

Another object of this invention is to provide improvements in the intake and exhaust systems for a cylinder of an internal combustion engine.

Another object of this invention is to provide an improved internal combustion engine apparatus wherein a secondary piston is utilized to ignite an ignition fuel/air mixture thereby providing high temperature gasses for establishment of a flame front within the combustion chamber of the internal combustion engine.

These and other objects and features of the present invention will become more fully apparent from the following description and appended claims taken in conjunction with the accompanying drawing.

BRIEF DESCRIPTION OF THE DRAWING

The drawing is a perspective view of a presently preferred embodiment of the apparatus of this invention with portions cut and broken away to reveal internal construction.

DETAILED DESCRIPTION OF THE PREFERRED EMBODIMENTS

The invention is best understood by reference to the drawing wherein like parts are designated with like numerals throughout.

General Discussion

Self-ignition or autoignition is a spontaneous chemical reaction that occurs when a mixture of fuel and oxygen spontaneously reacts without the necessity of a flame or spark to initiate combustion. When this occurs, the pressure and temperature abruptly increase because of the sudden release of chemical energy. The factors that control autoignition include (1) temperature, since if the temperature is high, the molecular energy is high and therefore, high energy molecular collisions can cause the formation of new molecules with a corresponding release of energy; (2) density, since if the density is high the number of collisions is many and therefore, the number of new molecules formed by collisions is great; and (3) reaction rate, since the rate of the reaction is also controlled by the relative numbers of reacting molecules (as represented by the air/fuel ratio) as well as by the presence of inert molecules (such as nitrogen in the air) that influence the reactive molecular collisions.

It is difficult to separate the effects of the various factors of autoignition. For example, if a homogenous fuel/air mixture were rapidly compressed and held at the high temperature and pressure achieved by the compression, the mixture may slowly cool without autoignition although an analysis of the mixture would undoubtedly show some signs of oxidation. However, if the compression is raised sufficiently, a state will finally be reached where self-ignition will occur. But even after this state is attained, an induction period is present and results in an ignition delay before the reaction becomes explosive. Accordingly, it is postulated that certain preflame conditions must occur during the induction period to condition the mixture for self-reaction. Although the exact mechanism of formation is unknown, it is believed that some intermediate product of combustion appears in the induction period and serves to catalyze the entire reaction to explosive speeds. When the mixture is compressed to higher temperatures than before, it is found that the ignition delay period is shortened considerably. This appears reasonable since, at the new state, the molecular activity is greater than before. Accordingly, it appears that autoignition of a perfectly homogenous mixture of gasses is controlled by several factors: (a) temperature, (b) density, (c) time, that is, the induction period, (d) composition including the fuel/oxygen ratio and the presence of inert gasses or any other substance that affects the chemical reaction, and (e) turbulence since if the mixture is not homogenous, a mixing factor is involved.

The term "ignition delay" is assigned to the time consumed by both the physical and chemical delays in the ignition process. For light fuels, the physical delay is small, while for heavy, viscous fuels, the physical delay may be the controlling factor. The physical delay is greatly reduced, therefore, by using high injection pressures and high turbulence or other techniques to facilitate breakup of the fuel jet. In most compression-ignition engines, the ignition delay is shorter than the duration of injection so that the combustion period can be considered to be divided into four stages: (1) ignition delay; (2) rapid pressure rise; (3) constant pressure rise; and (4) burning on the expansion stroke. The rapid pressure rise occurs because of the myriad ignition points and the accumulation of fuel during the delay period and is uncontrollable once started. Following this stage, in large diesel engines the final portions of the fuel are injected into the flame and consequently combustion of this portion is somewhat regulated by the injection rate. However, in medium (truck) and small automobile-sized engines, injection must be all at once in order to prevent detonation as set forth hereinbefore. Since the process is far from homogenous, combustion continues when the expansion stroke is well underway so that this continued burning can be referred to as the fourth stage of combustion.

It should be noted in the spark-ignition engine, ignition occurs at a single point, with consequent slow rise in pressure as compared to the compression-ignition engine wherein ignition occurs at many points with a consequent rapid rise in pressure. For this reason, the spark is initiated earlier, depending upon engine speed, on the compression stroke (say 30° before TDC) than does injection in a similar, but compression ignition engine (say 15° before TDC). Also, in the spark ignition engine, the flame speed is primarily controlled by turbulence created before the start of combustion. The turbulence created before combustion starts is referred to as primary turbulence. In the compression-ignition engine primary turbulence assists in breaking up the fuel jet and continues in intermixing the burned and unburned portions of the mixture. Accordingly, most compression-ignition engines that depend on primary turbulence are limited to low rotating speeds as compared to the spark-ignition engine because of the heterogenous mixture in the combustion chamber. Those mixtures that are not correct for combustion will not ignite until they are correct.

Maximum power output from the internal combustion engine is obtained when all of the oxygen in the cylinder is effectively consumed, thus releasing the chemical energy in the fuel. Accordingly, there will be an increase in power output with increase in fuel until a point is reached where all of the oxygen in the cylinder is effectively utilized for combustion. Although fuel flow can be increased while air flow is fixed by the design and displacement of the engine, it is, therefore, the air and not the fuel that imposes a limit to the power output. When it is realized (a) that the fuel and air are imperfectly mixed, (b) that the fuel may not be completely vaporized, and (c) that the clearance space is partially filled with exhaust products which dilute the concentration of fresh charge, it becomes evident that an excess of fuel, relative to the chemically correct mixture, must be employed to obtain maximum power.

On the other hand, the maximum economy of the engine, as determined by the specific fuel consumption, should be obtained when the release of chemical energy, per unit of fuel, is a maximum. This condition is secured when the fuel is completely burned, and therefore an excess of oxygen must be supplied. Since both lean and rich mixtures burn slowly, the piston will descend on the power stroke while energy is being liberated. Also, the energy released is used, in part, to overcome friction which is relatively constant. Because of these undesirable factors, the mixture for maximum economy of the engine will, therefore, not depart far from the chemically correct mixture. In summary, maximum power occurs when all of the air is burned with a rich air-fuel ratio, while maximum economy is obtained when a lean mixture is employed. The difference in ratios between these two performance points is controlled by the design of the engine.

In the torch ignition engine—using a two-cycle engine for ease of illustration—a charge of air is inducted into the cylinder through ports adjacent the top of the cylinder from a source of higher pressure such as a supercharger. As soon as the piston-operated exhaust ports are closed at the bottom of the cylinder, a partial charge of pure fuel is injected into a rapidly swirling air stream at the top of the cylinder and is thus carbureted within the cylinder. The air continues to flow in at the top until supercharged to the desired value and then the valve at the top closes and compression begins.

At the proper part of the compression cycle near TDC, the remaining portion of fuel charge is injected at a predetermined and controlled rate. Concurrent with injection of the fuel at this time, an ignition torch is introduced along with the fuel injection spray and in a direction that enhances the swirling action of the charge of carbureted air and partial fuel. The torch instantly ignites the combined second fuel charge as it mixes with the first fuel/air mixture. The first fuel/air mixture is set as rich as possible short of what is required for combustion (which would produce detonation) and the second fuel charge provides the remaining amount of fuel needed for optimal combustion. If necessary, the torch can continue to be introduced during the time the second fuel is injected in order to assist the establishment of a stationary flame front in juxtaposition with the fuel injection nozzle. As the fuel is injected, a flame front is initiated and continues to combust with new fuel/air mixture from the incoming swirl while discharging combusted products downstream. In this manner, all of the fuel can be completely combusted while producing a pressure rise within the cylinder that is optimum for each sweeping degree of arc of the power angle.

The combination of (a) relatively high temperature, (b) second fuel injection, (c) torch ignition, and (d) a rapidly swirling, partially-carbureted first fuel/air mixture insures that substantially all carbon monoxide and hydrocarbon pollutants are burned or never formed as such. Injection of the secondary fuel is regulated at a rate which will produce the desired pressure in the cylinder at all times. If the pressure is too high for part of the cycle, less fuel is injected during that part of the cycle, but if the pressure is too low, more fuel is injected. The fuel is thus injected at a rate that limits maximum pressure and temperature to modest values that are highest when the power angle will produce the greatest torque. Since maximum pressure is not excessively high, engine parts can be relatively light, such as in a spark-ignition engine, rather than extra strong and heavy as in a compression-ignition engine.

Since maximum pressure is not high, maximum temperature is likewise not excessively high. Without high temperatures, the production of oxides of nitrogen is low, similar to a spark-ignition engine. The same conditions that ensure complete combustion of carbon monoxide and hydrocarbons also ensures complete combustion of the second fuel injection to avoid the production of soot. The rapidly swirling, lean carbureted first fuel/air mixture is quite easily mixed with the relatively slowly injected second fuel injection so that all fuel combines with oxygen and is combusted. In summary, engine efficiency and horsepower are fully optimized by (a) using an optimum compression ratio and (b) combusting all of the injected fuel.

Various valve systems are utilized to induct air and expel exhaust over the desired speed range of an internal combustion engine. In a four-stroke cycle, the intake valve starts to open before TDC in order that the valve will be appreciably open near the start of the intake stroke. The intake valve remains open during the early part of the compression stroke to increase the charge of the cylinder at high speed and, also, to reduce the compression ratio at low speeds as a means for avoiding knock in the spark-ignition engine.

In similar fashion, the exhaust valve opens before the power stroke is completed, and closes after the intake process has begun. The early opening of the exhaust valve insures that the pressure in the cylinder will approach atmospheric before the piston begins the exhaust stroke. By this timing, part of the expansion energy of the gasses on the power stroke is lost, but this loss is more than compensated by the decreased amount of work necessary for the engine during the exhaust stroke. The gain, therefore, is at wide-open throttle and full-speed operation while at slower speeds, early opening of the exhaust is decidedly a loss. An alternative course would be to increase the size of the exhaust valve and port, but this remedy has, historically, been considered impossible for lack of room, and is considered undesirable since the larger valve would run hotter.

It should also be noted that both the intake and the exhaust valves may be open at the end of the exhaust stroke, which is also the beginning of the intake stroke and, therefore, the valves may be overlapped. The degree of overlapping is increased when maximum power at high speed is what is desired for then the scavenging process is encouraged. On the other hand, overlapped valves are not conducive to good part-load operation. In addition, some of the incoming carbureted mixture travels directly from the intake valve to the juxtaposed exhaust valve. The percentae of loss increases as the valve open overlapping time period increases. This unburned mixture comprises part of the pollutants in the exhaust that is the subject of much governmental concern.

The most common two-stroke cycle engine controls the intake process entirely by piston movement convering or uncovering the intake and exhaust ports. In some engines, a scavenging blower completes the exhaust process by supplying fresh air to push the exhaust gas out of the cylinder so that some air is wasted in this process (but not fuel).

Turbulence induced on the charging stroke and on the compression stroke, and also by the action of an injection spray itself, is referred to as primary turbulence. Once combustion has been initiated, the turbulence may be increased by the burning or exploding nature of the process, and this is referred to as secondary turbulence. Primary turbulence is most readily induced and, also, scavenging in a two-stroke-cycle engine is most efficient when flow is in one direction, uniflow. One method for obtaining uniflow is to locate the inlet ports in the cylinder and the outlet ports in the opposite end in the head. Another method is to use opposed pistons with the upper piston uncovering the inlet ports and the lower piston uncovering the exhaust ports. Additionally, all high-efficiency two-stroke-cycle engines employ scavening blowers to assist the exhaust and intake processes. The pressure in the intake manifold is maintained at a predetermined pressure and air cannot enter the cylinder until the scavenging pressure is less than the intake pressure and this occurs when the exhaust pressure falls below that of the scavening pressure.

The present invention relates to a completely new type of internal combustion engine, the true torch ignition engine. Ignition is not obtained by a spark and is not initiated by high compression within the main combustion chamber. In particular, a high temperature, high velocity, sustained torch of hot gases is produced in a secondary, combustion chamber and introduced into the main combustion chamber through a torch tube. The primary characteristic of such torch ignition is that it assures starting and operating the engine under various adverse conditions, such as in very cold weather, with poor fuel/air mixture, and completely eliminates the use of sparkplugs, glowplugs, or the like for starting. Additionally, ignition delay is reduced to a minimum. The fuel can also be injected slowly (at a controlled rate) without causing or enhancing detonation within the main combustion chamber. With the elimination of detonation, the maximum cylinder pressure can be limited (by slow secondary fuel injection) to a desired value, thus permitting construction of a much lighter engine block and cylinder head. Lower operating temperatures also reduce production of oxides of nitrogen.

The novel engine apparatus of this invention also involves a unique intake and exhaust system, the intake system producing a high degree of swirl within the main combustion chamber and for excellent mixing of the first, lean fuel and air mixture therein. The high swirl also readily assists in establishing a stationary flame front in the combustion chamber by continuously bringing new fuel/air through the combustion flame front thereby achieving substantially improved combustion. As a result of the foregoing, very few adverse combustion products such as soot are produced while providing a more efficient engine which can be operated at an optimum compression ratio and, therefore, is substantially quieter in operation. A more complete combustion also greatly reduces the emission of hydrocarbons, carbon monoxide, and other products of incomplete combustion to minuscule amounts.

Since the engine of this invention is readily adaptable to either a two-stroke or four-stroke cycle, higher rotational speeds can be achieved since (a) the engine has lighter pistons (lighter pistons being possible because of a lack of a high peak pressure, crankshafts, etc.), and (b) the cushioning effect of the compression at the end of each stroke as the piston reaches TDC.

The higher valving efficiency of this invention permits use of a two-cycle engine while concurrently permitting the power stroke of the engine to be of longer duration (approximately 135 degrees versus approximately 120 degrees or less in the conventional engine) and also allows faster movement of gaseous products in and out of the engine, which thereby increases horsepower and efficiency of the engine. Additionally, this engine does not require an electronic ignition system which is frequently susceptible to failure and requires frequent maintenance, and as a result, the engine will be more reliable. The engine of this invention is also more reliable under engine of this invention is also more reliable under various adverse weather conditions, poor fuel/air mixtures, and the like.

Referring now to the drawing, the novel torch ignition apparatus of this invention is shown generally at 10 and includes an engine block 12 with a piston 14 cooperating in a cylinder 16. Cylinder 16 is surmounted by a cylinder head 18 thereby forming a combustion chamber 20 between piston 14 and cylinder head 18.

A torch piston 22 is coaxially mounted to piston 14 by means of a threaded boss 23 and slidingly cooperates in a torch cylinder 26. A torch ignition chamber 30 is formed between the upper end of torch piston 22 and a spring-biased, torch cylinder head 24. Torch cylinder head 24 is a spring-biased piston in that it is movable in the upper end of torch cylinder 26. However, to avoid confusion, and also since it cooperates with torch ignition piston 22 to form torch ignition chamber 30, it will be referred to throughout as torch cylinder head 24. An annular flange 38 around the upper end of torch cylinder head 24 is adapted to be placed in abutment with an upper end 27 of torch cylinder 26. A spring 34 serves to bias torch cylinder head 24 downwardly so that the flange 38 is brought into abutment with upper end 27 of torch cylinder 26. Spring 34 is maintained within a spring housing 32 mounted to upper end 27 of torch cylinder 26. A spring block 36 is threadedly engaged with spring housing 32 and serves to adjustably maintain the desired compression on spring 34.

An ignition torch exhaust port 42 is formed in a wall of torch cylinder 26 in the vicinity of torch ignition chamber 30 and is in communication with a torch tube 40 extending downwardly into fluid communication with combustion chamber 20 through a torch ignition port 56. An intake port 50 is formed in the wall of torch cylinder 26 and provides fluid communication for a torch fuel/air mixture 52 introduced through an intake tube 28 (shown broken for ease of illustration). A check valve is formed in intake tube 28 and consists of a valve body 44 cooperating between a valve intake 48 and a valve exhaust 46.

Cylinder head 18 is mounted to the upper end of engine block 12 by means of a plurality of cylinder head pillars 66 formed coextensively with the wall of cylinder 16 and fabricated as a plurality of spaced pillars around the upper periphery of cylinder 16. Cylinder head 18 includes a cylindrical wall 68 over which a hoop valve 60 slidingly cooperates. Wall 68 extends upwardly a predetermined distance to provide a sealing relationship when hoop valve 60 is raised upwardly. Intake ports 70 are formed as the spaces between cylinder head pillars 66 and are formed as a plurality of intake ports around the periphery of combustion chamber 20. Intake ports 70 are closed by downward movement of hoop valve 60 with the space represented by intake ports 70 being occupied by valve inserts 64 mounted to the internal face of hoop valve 60. The openings of valve intake ports 70 are covered by valve inserts 64 which are fabricated from a suitable high temperature material such as zirconium oxide, silicon nitride, or other conventional, ceramic, or cermet materials having the desirable high temperature properties.

Cut-outs (not shown) in the internal face of hoop valve 60 represent the spaces between valve inserts 64 and provide the necessary opening in hoop valve 60 for cylinder head pillars 66 when hoop valve 60 is lowered downwardly thereover. Hoop valve 60 includes a plurality of valve rings 62 to accommodate sealing relationship between hoop valve 60 and wall 68. Hoop valve 60 further includes an outwardly extending flange 61 which is adapted to sealingly engage a plurality of compression rings 76 formed in the upper periphery of cylinder 16.

Advantageously, hoop valve 60 provides a substantially increased intake area for intake ports 70 even though a substantial portion (up to ½) of the potential surface area is blocked by cylinder head pillars 66. Decreasing the width of cylinder head pillars 66 relative to the width of intake ports 70 would, selectively, provide a corresponding increase in the surface area of intake ports 70. A simple mathematical calculation will demonstrate that there is a several-fold increase in intake port area provided by a hoop valve 60 versus the conventional poppet valve systems.

The upper periphery of engine block 12 is formed as an annular rim 75 having a plurality of guide vanes 74 mounted thereon. Rim 75 also serves as the basal support for an intake housing 92, intake housing 92 enclosing all of the upper portion of the ignition apparatus 10 of this invention and also serving as a covering to provide an intake plenum 90 as will be set forth more fully hereinafter. Intake housing 92 also includes an intake port (not shown) to provide fuel/air from the intake manifold (not shown) into the intake plenum 90.

The lower portion of cylinder 16 includes a plurality of exhaust ports 80. Exhaust ports 80 communicate with an exhaust plenum 82 formed as an annular chamber surrounding the lower portion of cylinder 16. Exhaust ports 80 are fabricated as a plurality of openings between columns 78, columns 78 serving to provide the necessary interconnection for cylinder 16 and also including coolant channels 17 therethrough. The arrangement of exhaust ports 80 is also novel in that a greatly enlarged exhaust port area is exposed upon the downward movement of piston 14 thereby permitting the rapid clearing of exhaust products from combustion chamber 20 as will be set forth more fully hereinafter. The only limiting factor therein is determined by the width of pillars 78 and the height of exhaust ports 80.

Cooling for engine block 12 is provided through coolant channels 17 surrounding cylinder 16 and coolant channel 19 in cylinder head 18.

In operation, the engine apparatus 10 of this invention is configurated for two-cycle operation with a flow-through of gaseous products from the upper, intake ports 70 through the combustion chamber 20 and out the lower, exhaust ports 80 into the exhaust plenum 82. However, torch ignition will work equally well on four-cycle engines. Intake fuel/air mixture is introduced into intake plenum 90 from the intake manifold (not shown) and directed by vanes 74 through intake ports 70. The orientation of vanes 74 is such that the fuel/air mixture in combustion chamber 20 has imparted thereto a counterclockwise swirl. After the fuel/air mixture has been introduced into combustion chamber 20, hoop valve 60 is closed by being moved downwardly into sealing relationship with valve rings 76. The upward movement of piston 14 then compresses the fuel/mixture in combustion chamber 20.

A second fuel/air mixture 52 is introduced through port 50 into torch ignition chamber 30. The second fuel/air mixture 52 is of the desired optimum fuel and air mixture to support combustion upon compression as in a compression ignition system. Upward movement of piston 14 correspondingly moves torch piston 22 upwardly to compress the second fuel/air mixture 52 in torch ignition chamber 30 so that ignition of the same is obtained. The desired ignition point for the second fuel/air mixture in torch ignition chamber 30 is selectively obtained by adjustably setting the tension on spring 34 through upward or downward movement of spring block 36. The ignition of the second fuel/air mixture 52 in torch ignition chamber 30 results in an explosion and a corresponding raising of torch cylinder head 24, as illustrated. The hot combustion products are allowed to escape through port 42 into torch tube 40 and out torch outlet 56 into combustion chamber 20.

During the downstroke, torch piston 22 again drops below port 50 to permit the pressurized, second fuel/air mixture 52 to be introduced into torch ignition chamber 30. Correspondingly, torch cylinder head 24 and, more particularly, rim 38 is forced downwardly against upper end 27 by spring 34 so that torch cylinder head 24 closes outlet port 42. Importantly, the tension on spring 34 is adjustably predetermined so that a preselected pressure is obtained on the second fuel/air mixture in torch ignition chamber 30 to cause a selectively timed ignition of the same under pressure. The resultant increased pressure following ignition again raises torch cylinder head 24 against spring 30 exposing exit port 42 to thereby permit the hot combustion products to be vented through torch tube 40 and out through torch port 56.

Supplemental fuel is simultaneously supplied through fuel conduit 54 in conjunction with the hot combustion products through torch port 56. Torch port 56 is mounted adjacent fuel conduit 54 and tangentially to combustion chamber 20 thereby enhancing swirling action inside combustion chamber 20. The swirling action imparted to the first fuel/air mixture by vanes 74 brings a continuous supply of compressed, first fuel/air mixture into contact with hot combustion products and supplemental fuel thereby providing ignition of the combined fuel/air mixture within combustion chamber 20. Importantly, the first fuel/air mixture in intake plenum 90 has an inadequate fuel ratio therein to support combustion in the absence of supplemental fuel. The supplemental fuel introduced through conduit is heated above its combustion temperature so that contact with oxygen in the first fuel/air mixture results in a combustion not only of the supplemental fuel but also the initial fuel in the first fuel/air mixture. Advantageously, the introduction of hot combustion gasses through port 56 provides a sustained ignition of the first and second fuel/air mixtures for a more thorough combustion of the same during the time span that piston 14 is moving upwardly toward top dead center and during the initial stages of the power stroke. This is a distinct advantage over the relatively short ignition span of a compression ignition engine and even of a conventional spark-initiated combustion cycle and also permits control of maximum combustion chamber pressure, keeping it lower than in current engines, thus permitting lighter engine construction.

Additionally, since diesel-type fuels tend to burn extremely fast or even detonate when carbureted with air (oxygen), the first fuel/air mixture must have quite a low percentage of fuel. However, by adding about 10 percent water, either to the fuel or mixed with the induction air, the percentage of fuel in the first fuel/air mixture can be increased without incurring detonation for better burning and, subsequently, more complete combustion resulting in a higher efficiency.

Thereafter, piston 14 continues its downward stroke until the exhaust ports 80 are exposed with a resultant expansion of the exhaust products therethrough into exhaust plenum 80. Simultaneously, hoop valve 60 is raised upwardly permitting the pressurized first fuel/air or water/air mixture in intake plenum 90 to be swirled by vanes 74 into combustion chamber 20. The inrush of first fuel/air mixture into combustion chamber 20 also serves to sweep all of the residual exhaust products through exhaust ports 80. Reversal of the direction of piston 14 to the upward direction again covers exhaust ports 80 and the timed closure of hoop valve 60 allows piston 14 to compress the first fuel/air mixture in combustion chamber 20, thereby repeating the ignition cycle.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A torch ignition apparatus for an internal combustion engine comprising:

at least one combustion chamber of an internal combustion engine, the combustion chamber comprising a primary combustion chamber and being formed in a cylinder of the internal combustion engine between a piston cooperating in the cylinder and a cylinder head, the piston being operable to compress a first gaseous mixture of fuel and air in the primary combustion chamber;

intake means for introducing the first fuel and air mixture into the combustion chamber, the ratio of fuel to air being lower than necessary to sustain combustion of the first fuel and air mixture in the combustion chamber; and ignition means for igniting the first fuel and air mixture in the combustion chamber, the ignition means comprising a torch ignition piston extending coaxially from the piston and the ignition means comprises a torch ignition cylinder mounted to the cylinder head and receiving the torch ignition piston, the ignition means further comprising a torch ignition chamber formed in the torch ignition cylinder between the torch ignition piston and a spring-biased torch ignition floating piston, a second fuel and air intake means for introducing a second fuel and air mixture into the torch ignition chamber, and a torch tube extending between the torch ignition chamber and the primary combustion chamber, the torch tube directing the gaseous stream of combustion products from the torch ignition chamber to the combustion chamber, thereby injecting a gaseous stream of combustion products and a supplemental fuel heated above the ignition temperature of the first fuel and air mixture in the combustion chamber into the combustion chamber.

2. The torch ignition apparatus defined in claim 1 wherein the spring-biased torch ignition cylinder head further comprises adjustment means for adjusting spring compression on the spring-biased torch ignition cylinder head.

3. The torch ignition apparatus defined in claim 1 wherein the ignition means further comprises jet means for intermixing the supplemental fuel with the gaseous stream of combustion products upon injection into the combustion chamber.

4. The torch ignition apparatus defined in claim 3 wherein the jet means comprises a mixing jet mounted obliquely to the cylinder head thereby enhancing a swirling action in the combustion chamber with the gaseous combustion products and the supplemental fuel.

5. The torch ignition apparatus defined in claim 1 wherein the intake means comprises a plurality of intake ports surrounding the upper periphery of the combustion chamber, and a hoop valve for selectively closing all of the intake ports, and an intake housing enclosing the intake ports and the hoop valve in an intake plenum.

6. The torch ignition apparatus defined in claim 5 wherein the intake means further comprises a plurality of guide vanes arrayed around the intake ports, the guide vanes being oriented to direct the first fuel and air mixture into the combustion chamber in a swirling pattern.

7. The torch ignition apparatus defined in claim 5 wherein the hoop valve comprises a plurality of inserts mounted to the inside of the hoop valve in positions corresponding to the intake ports, the inserts being fabricated from a refractory material and occupying space to help maintain a high compression when the piston is at the top (TDC).

8. The torch ignition apparatus defined in claim 1 wherein the cylinder comprises a plurality of exhaust ports in the cylinder at the lower end of the combustion chamber, the exhaust ports being arrayed in a circumferential band around the cylinder, the exhaust ports being opened and closed by reciprocatory movement of the piston in the cylinder.

9. The torch ignition apparatus defined in claim 8 wherein the exhaust ports are separated by coolant columns, each coolant column providing a channel for a coolant in heat exchange relationship with exhaust passing through the exhaust port.

10. A torch ignition apparatus for an internal combustion engine, the internal combustion engine having at least one combustion chamber between a cylinder head and a piston cooperating in a cylinder, comprising:

intake means for introducing a first fuel and air mixture or air only into the combustion chamber, the intake means comprising an intake housing enclosing at least the combustion chamber portion of the internal combustion engine, a plurality of intake ports through the cylinder wall into the combustion chamber, a hoop valve for selectively occluding all of the intake ports, and a plurality of guide vanes adjacent the intake ports, the guide vanes importing a swirling action to the first fuel and air mixture or air only passing through the intake ports into the combustion chamber;

fuel injection means for injecting partial fuel subsequently into the combustion chamber;

ignition means for igniting the first fuel and air mixture or air and, subsequently, injected partial fuel injection in the combustion chamber comprising a torch ignition cylinder extending coaxially from the cylinder head, a spring-biased, torch ignition floating piston in the end of the torch ignition cylinder, a torch ignition piston extending coaxially from the piston and cooperating in the torch ignition cylinder to form a compression ignition chamber in the torch ignition cylinder adjacent the spring-biased, torch ignition floating piston;

a second intake means for introducing a second fuel and air mixture into the compression ignition chamber, a torch tube for directing combustion products from the compression ignition chamber into the combustion chamber, and a fuel jet for introducing a supplemental fuel into the combustion chamber adjacent the torch tube; and exhaust means for removing combustion products from the combustion chamber comprising a plurality of exhaust ports through the cylinder wall and operated upon movement of the piston.

11. The torch ignition apparatus defined in claim 10 wherein the ignition means further comprises adjustment means for selectively adjusting spring tension on the spring-biased, torch ignition floating piston.

* * * * *